June 26, 1956  A. M. LIPPISCH  2,752,109
FLUID SUSTAINED AND PROPELLED AIRCRAFT
Filed Oct. 6, 1954  2 Sheets-Sheet 1

INVENTOR
ALEXANDER M. LIPPISCH
BY
ATTORNEY

June 26, 1956  A. M. LIPPISCH  2,752,109
FLUID SUSTAINED AND PROPELLED AIRCRAFT
Filed Oct. 6, 1954  2 Sheets-Sheet 2

INVENTOR
ALEXANDER M. LIPPISCH
BY Myron Moody
ATTORNEY

United States Patent Office 2,752,109
Patented June 26, 1956

2,752,109

FLUID SUSTAINED AND PROPELLED AIRCRAFT

Alexander M. Lippisch, Cedar Rapids, Iowa, assignor to Collins Radio Company, Cedar Rapids, Iowa, a corporation of Iowa Application October 6, 1954, Serial No. 460,676

2 Claims. (Cl. 244—23)

This invention relates in general to aircraft, and in particular to aircraft capable of hovering or moving with high forward velocity. As the field of aviation has been developed limiting factors have been encountered which substantially reduce the maximum possible forward speed. For example, the lift of present-day conventional aircraft results from passing a wing through the air. These wings are long and result in a great deal of drag. Since drag varies as the square of the velocity, the limiting speed is soon obtained.

The wing serves to produce a lifting force by deflecting downwardly a mass of air equivalent to the weight of the aircraft. Thus, if a mass of air equal to the weight of the aircraft may be deflected downwardly by some other means it is possible to eliminate the wing and its resultant high drag.

The present invention, therefore, relates to an aircraft which has no wing, but which produces a downward thrust by deflecting large masses of air downwardly.

Figure 1:
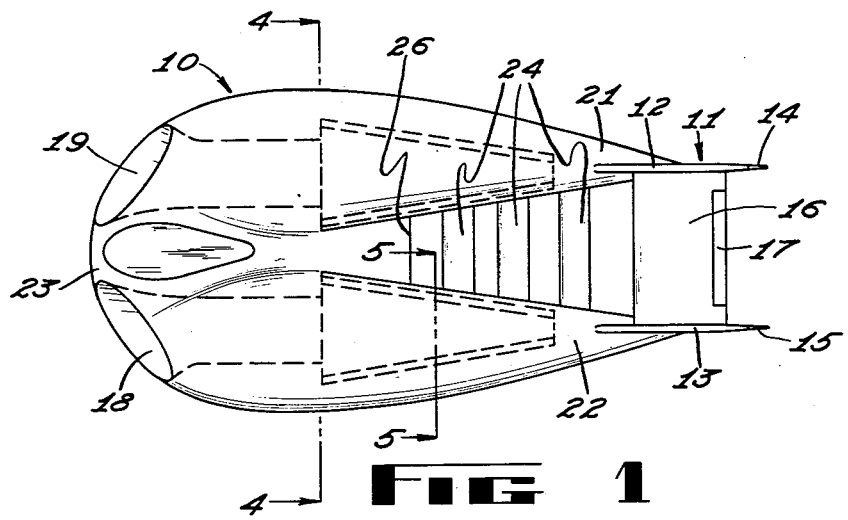
Figure 2:
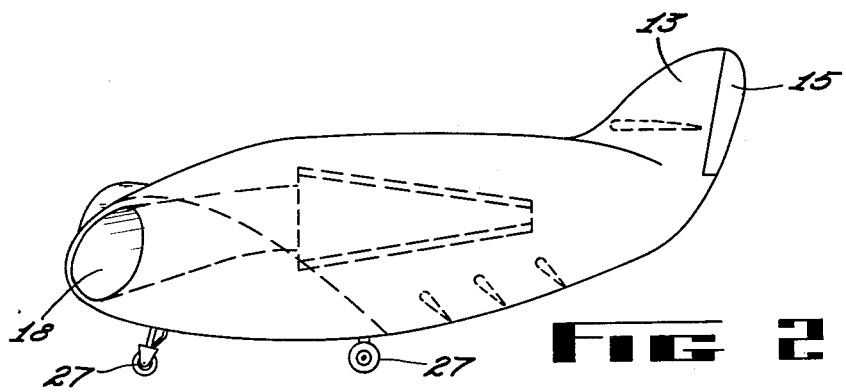
Figure 3:
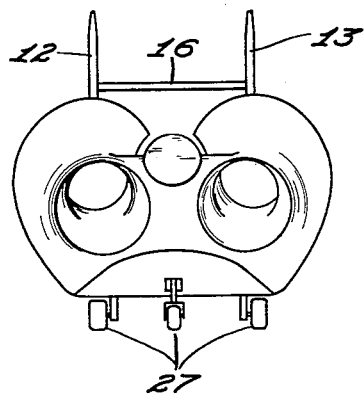
Figure 4:
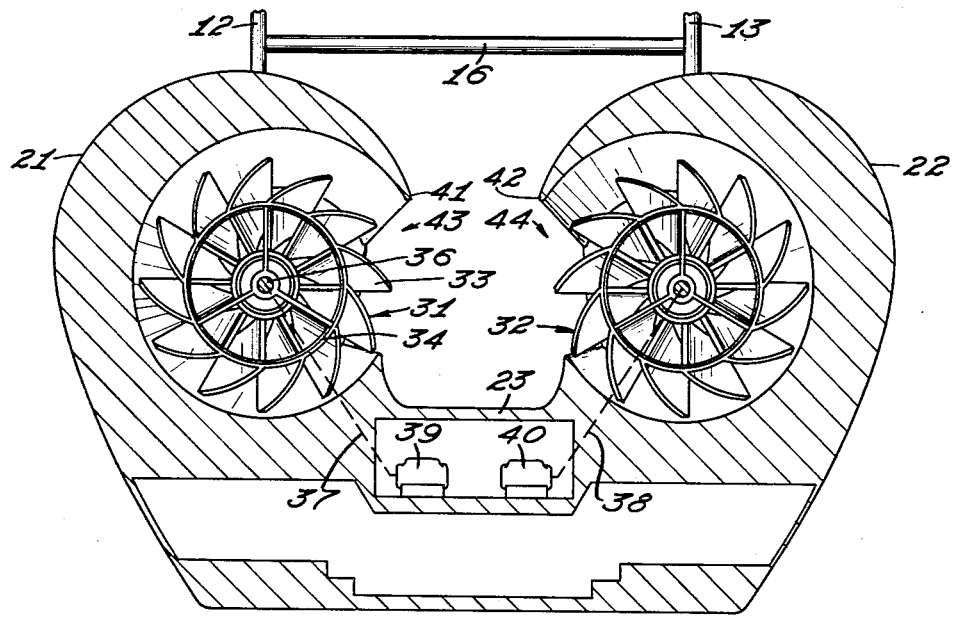
Figure 5:
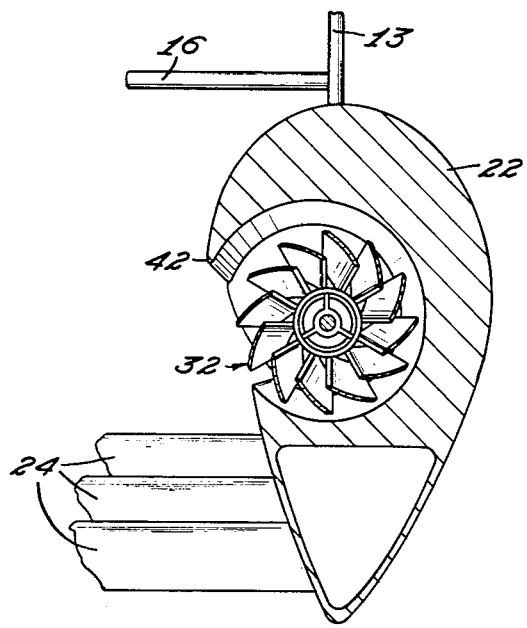

Further features, objects and advantages of the invention will become apparent from the following description and claims when read in view of the drawings, in which:

Figure 1 is a top view of the aircraft of this invention;
Figure 2 is a side view of this aircraft;
Figure 3 is a front view;
Figure 4 is a sectional view taken on line 4—4 from Figure 1; and
Figure 5 is a half-sectional view of the aircraft taken on line 5—5 from Figure 1.

This invention relates to a wingless aircraft driven by the action of rotors.

As known, a rotor as used in a squirrel-cage blower produces a flow with good over-all efficiency if a large mass flow and a small pressure rise is expected. If such a rotor is made a certain length and the intake established on only one side, the air which is sucked in will have both an axial component and a rotational or tangential velocity component when it leaves the blower. The reaction, therefore, is an axial thrust and a lift component if the exit is turned downward. An aircraft designed according to these observations is represented in the drawings.

The aircraft includes a streamlined body with a tailpiece on each side. The space between the tailpieces allows air to flow over the front surface and the upper surface of the tailpieces. There are two intakes leading into two conical rotors located in the upper part of the tailpieces. The rotors are counter-rotating against each other so that they blow the air down along the inner walls of the space between the tailpieces. This is, for instance, accomplished by driving both rotors from a common gear box and from one or several engines installed within the body. To provide an equal mass flow through slots opening along the inner walls of the tailpieces, the rotors are favorably made conical so that the inner space is proportional to the mass flow through this space. I have found through experiments that with a long straight rotor of this type most of the air goes out at the end of the rotor opposite the intake.

It can be seen from the drawings that such a body offers a large amount of space to be used for the pilots' cabin, the engine room, fuel and cargo. The front part of the body includes a thick section which produces a certain amount of lift when the outer air is sucked into the opening between both tailpieces. This motion of the outer air is produced by the air stream coming out of the rotors through slots extending along the inner walls of the tailpieces.

The particular design of the rotor blades, their sections, and their positions may be made according to the working conditions. Straight blades or forward or backward-inclined blades can be used. The position of the rotor axes can also be different for different purposes of the aircraft. For instance, to produce a larger amount of forward thrust, the side pieces can be extended more in an upward position so that the slots on both inner sides of these side pieces have a negative angle of inclination towards the direction of motion. This will result in a larger forward thrust. Control vanes can be arranged at the outlet of the diffuser to control such a craft chiefly in hovering and at extremely low speeds.

The speed control will be maintained by flying the craft at different pitch angles; upward being low-speed or hovering; a downward angle being a higher speed. The main advantage of such an arrangement is a large amount of mass flow which can be obtained mainly along the longitudinal axis. Also, the action of the rotors produces the two necessary flow components, rearward and downward thrust.

Figure 1 illustrates a fuselage designated generally as 10, which has an empennage 11 comprising a pair of vertical stabilizers 12 and 13 and rudders 14 and 15. A horizontal stabilizer 16 extends between the vertical stabilizers 12 and 13, and an elevator 17 is attached to the trailing edge thereof.

The fuselage 10 is formed with a pair of longitudinal openings 18 and 19 which extend substantially therethrough and which extend into boom portions 21 and 22 that connect to the empennage 11. The pilot and cargo-carrying portion of the fuselage 23 is mounted between the ducts 18 and 19. Extending between the booms 21 and 22 are a plurality of control surfaces 24 that may be adjusted for a purpose to be later described. The cargo portion 23 of the fuselage terminates with a trailing edge 26 forward of the first control surfaces 24. Several retractable ground wheels 27 are mounted in the fuselage in the lower portion thereof.

The booms 21 and 22 rotatably support axial blowers 31 and 32 as best shown in Figure 4. Each of the blowers comprises a plurality of impeller blades 33 mounted on a superstructure 34 which is rotatably supported on a longitudinal shaft 36. As shown in Figure 4 the axial blowers are connected by suitable shafts 37 and 38 to driving means 39 and 40 mounted in the portion 23. The top portions of booms 21 and 22 are slotted and terminate at points 41 and 42, thus leaving openings 43 and 44 from which air may be emitted from the blowers 31 and 32. Due to the curvature of the impeller blades 33 and the spiral arrangement with which they are mounted on the apparatus, air may be deflected downwardly and rearwardly simultaneously. It is to be noted that the trailing edge of the rear portion 23 terminates forwardly of the rear end of the blowers, thus allowing air to move downwardly between the tail booms, and thus gives upward lift.

In operation, the driving means 39 and 40 are started and the control surfaces 24 are pointed substantially downward, as shown in Figure 2. The blowers 31 and 32 then receive air through the ducts 18 and 19 and impel it downwardly and rearwardly. Due to the position of the control surfaces 24 a substantial portion of the mass will be moved downwardly, thus giving a lift reaction on the aircraft. When the reaction is great enough to cause the aircraft to rise from the ground flight is sustained. After the aircraft has obtained a safe altitude the control surfaces 24 may be rotated to a more nearly horizontal position and a larger percentage of the reaction from the blowers will be in the forward direction, thus causing the aircraft to move rapidly through the air. It is to be noted that the opening between booms 21 and 22 allows the emitted air from the blowers to draw additional air between the booms from above the aircraft. This produces additional lift. The booms 21 and 22 are formed of airfoil sections with the sides of greater camber facing each other. This results in a lift being produced due to air sucked downwardly from above between the booms. This is because lift is created on the side of greater camber of an airfoil section. Thus an increase in efficiency is obtained as specified in my Patent No. 2,696,953.

The blowers 31 and 32 may be tapered as shown in the drawings. Then as a portion of the air is emitted, less air will be impelled downwardly and thus less radius will be needed by the blower.

It is seen that this invention relates to a wingless aircraft capable of landing and taking off at substantially zero forward velocity and capable of high forward velocity due to the low profile drag.

Although it has been described with respect to a particular embodiment thereof, it is not to be so limited as changes and modifications may be made therein which are within the full intended scope of the invention as defined by the appended claims.

I claim:

1. An aircraft comprising a forward body portion, a pair of booms extending rearwardly from said body portion and defining a space therebetween, an empennage connecting the rear ends of said booms, a plurality of control surfaces supported between said booms adjustable about horizontal transverse axes, said body having a pair of intake openings in its front end, each of said booms having an inboard longitudinally disposed slot communicating with said space, a first passage extending longitudinally in said body portion and in one of said booms connecting one of said intake openings with one of said slots, a second passage extending longitudinally in said body portion and in the other of said booms connecting the other of said intake openings with the other of said slots, an axial blower in each of said passages, and driving means connected to said blowers, said blowers being adapted to force air rearwardly through said passages and downwardly and rearwardly across said control surfaces to produce lift and propulsion forces on the aircraft.

2. The aircraft of claim 1 wherein the normals to the planes defined by said slots are each directed below the horizontal line between said slots.

References Cited in the file of this patent
UNITED STATES PATENTS

| | | |
|---|---|---|
| 1,864,912 | Johnson | June 28, 1932 |
| 2,470,348 | Haight | May 17, 1949 |
| 2,619,302 | Loedding | Nov. 25, 1952 |